United States Patent [19]

Heeks et al.

[11] Patent Number: 4,925,895

[45] Date of Patent: May 15, 1990

[54] HEAT STABILIZED SILICONE ELASTOMERS

[75] Inventors: George J. Heeks, Rochester; Arnold W. Henry, Pittsford; Edward L. Schlueter, Jr., Rochester, all of N.Y.

[73] Assignee: Xerox Corporation, Stamford, Conn.

[21] Appl. No.: 194,068

[22] Filed: May 12, 1988

Related U.S. Application Data

[60] Division of Ser. No. 18,372, Feb. 24, 1987, Pat. No. 4,777,087, which is a continuation-in-part of Ser. No. 740,930, Jun. 3, 1985, abandoned.

[51] Int. Cl.[5] .......................... C08K 9/08; C08K 3/10; C08L 83/07; C08L 83/06

[52] U.S. Cl. .................................... 524/714; 524/701; 524/707; 524/711; 524/722; 524/723; 524/724; 524/730; 524/731; 524/860; 524/862; 524/863

[58] Field of Search ............... 524/714, 701, 707, 711, 524/722, 723, 724, 730, 731, 860, 862, 863

[56] References Cited

U.S. PATENT DOCUMENTS

| | | | |
|---|---|---|---|
| 2,389,802 | 11/1945 | McGregor | 260/607 |
| 2,465,296 | 3/1949 | Swiss | 174/121 |

(List continued on next page.)

FOREIGN PATENT DOCUMENTS

| | | |
|---|---|---|
| 0062408A1 | 10/1982 | European Pat. Off. . |
| 204526 | 12/1986 | European Pat. Off. . |
| 1000563 | 8/1965 | United Kingdom . |
| 1058238 | 2/1967 | United Kingdom . |

OTHER PUBLICATIONS

Brydson, "Plastics Materials"; p. 675; Newnes-Butterworths, London 1975.

(List continued on next page.)

*Primary Examiner*—C. Warren Ivy

[57] ABSTRACT

A silicone composition curable to a heat stabilized silicone elastomer comprising at least one polyorganosiloxane having the formula:

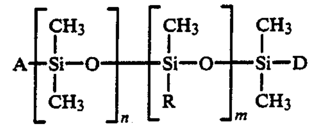

where R is hydrogen or substituted or unsubstituted alkyl, alkenyl or aryl having less than 19 carbon atoms, each of A and D may be any of methyl, hydroxy or vinyl groups, $$0 < m/n \leq 1 \text{ and } m+n > 350,$$

a complex comprising a transition metal salt of at least one polydentate chelating ligand having the formula:

$$Z(R_1-X)_pR_1-E \text{ or } Z(\underset{X'}{R'_1})_pR_1-E$$

where each $R_1$ may be an alkyl biradical having 1 to 6 carbon atoms or an aryl biradical having less than 19 carbon atoms $R_1$, is an X' substituted $R_1$, each of Z and E may be any of carboxy thiocarboxy, dithiocarboxy, or $-N(R_2)_2$, $-As(R_2)_2$, $-S(R_2)$ where each $R_2$ may be any of hydrogen or an alkyl radical having 1 to 6 carbon atoms or any aryl radical having less than 19 carbon atoms, X' may be any of hydrogen, carboxy, thiocarboxy, dithiocarboxy, $-N(R_2)_2$, $-A_s(R_2)_2$, or $-S(R_2)$, X is $-N(R_2)-$, $-A_s(R_2)-$, or $-S-$ and p is 0 to 4 present in the composition in an amount sufficient to inhibit oxidative degradation of the polyorganosiloxane and a finely divided filler and effective amounts of crosslinking agent and catalyst. The complex may be predispersed in a polyorganosiloxane oil having a viscosity within a range of to 50 to 100,000 centistokes. In a preferred embodiment for use in an electrostatographic reproducing machine a fuser member is made with an addition curable polyorganosiloxane and the complex is bis(ethylene diamine) copper (II) sulfate initially redispersed in a low viscosity silicone oil and subsequently dispersed in a higher viscosity silicone oil.

52 Claims, 4 Drawing Sheets

U.S. PATENT DOCUMENTS

| | | | |
|---|---|---|---|
| 3,216,969 | 11/1965 | Cyba | 524/204 |
| 3,419,593 | 12/1968 | Willing | 260/448.2 |
| 3,445,420 | 5/1969 | Kookootsedes et al. | 260/37 |
| 3,647,741 | 3/1972 | Hutchinson | 268/37 |
| 4,019,024 | 4/1977 | Namiki | 219/469 |
| 4,074,001 | 2/1978 | Imai et al. | 428/239 |
| 4,078,286 | 3/1978 | Takiguichi et al. | 29/132 |
| 4,108,825 | 8/1978 | Hayes | 260/375 B |
| 4,162,243 | 7/1979 | Lee et al. | 260/375 B |
| 4,357,388 | 11/1982 | Minor | 428/331 |
| 4,360,566 | 11/1982 | Shimiju | 428/450 |
| 4,373,239 | 2/1983 | Henry | 428/450 |
| 4,444,944 | 4/1984 | Matsushita | 524/786 |
| 4,463,118 | 7/1984 | Evans et al. | 524/264 |
| 4,518,655 | 5/1985 | Henry | 29/132 |
| 4,603,087 | 7/1986 | Ema | 428/447 |

OTHER PUBLICATIONS

Noll, "Chemistry and Technology of Silicones", pp. 285, 388, 408–411.

Pp. 468 and 1576 from McGraw–Hill "Dictionary of Scientific and Technical Terms".

Pp. 766 and 922 from "The Condensed Chemical Dictionary", Eighth Edition, revised by Gessner G. Hawley.

Pp. 37–39, 48, 63–66, 92–96 from Reinhold Plastics Application Series on "Silicones" by R. N. Meals et al., ©1959 by Reinhold Publ. Corp., Second Edition 1961.

Pp. 692 of the Eighth Edition of the Condensed "Chemical Dictionary".

Pp. 207 of the Second Edition of the "The Encyclopedia of Chemistry".

Research Disclosure, No. 120, Apr. 1974, p. 10.

Increasing the Thermal Stability of Polyorganosiloxanes by Modifying them with Copper (II) Complexes–E. K. Lugouskaya et al.–Plasticheskie Massy, vol. 8, 1983.

Chemistry of Organic Compounds, Noller, pp. 119 and 535, Second Edition, 1957 W. B. Saunders Company Introduction to Organic Chemistry, Streitwieser, Jr., Heathcock, pp. 388–389, Second Edition, Macmillan Publishing Co., Inc. 1981.

Basic Principles of Organic Chemistry, pp. 449–451, Roberts, Caserio, California Institute of Technology, 1964.

HEAT STABILIZED SILICONE ELASTOMERS

This is a division, of application Ser. No. 07/018,372, filed February 24, 1987 now U.S. Pat. No. 4,777,087. which is a continuation-in-part application of our co-pending, but now abandoned, application Ser. No. 740,930, filed on June 3, 1985, and entitled Heat Stabilized Silicone Elastomers, the disclosure of which is totally incorporated herein by reference.

The present invention relates to silicone compositions which are curable to a heat stabilized silicone elastomer. In particular, it relates to the use of such compositions as fuser members for electrostatographic reproducing apparatus.

BACKGROUND OF THE INVENTION

As indicated in U.S. Pat. No. 4,078,286, in a typical process for electrophotographic duplication, a light image of an original to be copied is recorded in the form of an electrostatic latent image upon a photosensitive member, and the latent image is subsequently rendered visible by the application of electroscopic particles, which are commonly referred to as toner. The visible toner image is then in a loose, powdered form and it can be easily disturbed or destroyed. The toner image is usually fixed or fused upon a support which may be the photosensitive member itself or another support such as a sheet of plain paper. A principle aspect of the present invention relates to the fusing of the toner image upon a support.

In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

The use of thermal energy for fixing toner images onto a support member is well known. Several approaches to thermal fusing of electroscopic toner images have been described in the prior art. These methods include providing the application of heat and pressure substantially concurrently by various means: a roll pair maintained in pressure contact; a flat or curved plate member in pressure contact with a roll; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the fuser roll thereby to affect heating of the toner images within the nip. Typical of such fusing devices are two roll systems wherein the fusing roll is coated with an abhesive material, such as a silicone rubber or other low surface energy elastomer or, for example, tetrafluoroethylene resin sold by E. I. DuPont de Nemours under the trademark TEFLON. The silicone rubbers which can be used as the surface of the fuser member can be classified into three groups according to the vulcanization method and temperature, i.e. room temperature vulcanization silicone rubber hereinafter referred to as RTV silicone rubber, liquid injection moldable or extrudable silicone rubber, and high temperature vulcanization type silicone rubber, referred to as HTV rubber. All these silicone rubbers or elastomers are well known in the art and are commerically available.

One of the more common roll fuser materials comprises either fuser rolls or pressure rolls made from a condensation cured polyorganosiloxane which is filled with finely divided iron oxide to provide thermal conductivity and stability throughout the silicone rubber layer and also impregnated with a small amount, up to about 10% for example of a low viscosity, about 100 centistokes, silicone oil. Fuser and pressure rolls made from such a composition are capable of performing satisfactorily but they have their useful life limited inasmuch as the fusing operation occurs at a temperature in the region of 400° F. and oxidative crosslinking of the methyl groups on the polyorganosiloxane rubber will result in a higher crosslinked polysiloxane producing lower toughness, lower elongation, a higher modulus material and a lower fatigue life. The mechanism of the oxidative degradation of the polyorganosiloxane is not fully understood, however, it is believed that at elevated temperatures (of the order of 400° F.) such as are employed in the fusing of toner images on a copy sheet, the oxygen attacks the methyl groups of the siloxane elastomer oxidizing them thereby permitting oxidative crosslink hardening of the material. The attack by oxygen is believed to create free radicals which by further reaction eventually results in a silicon-oxygen-silicon crosslink thereby hardening the elastomer. In particular, the toughness, (determined from a plot of stress versus strain indicating the amount of energy it takes to fracture the elastomer from tensile stress and elongation) the area under the stress strain curve may be reduced dramatically leading to fuser roll failure. For example, a typical material impregnated with about 10% by volume silicone oil as a release material has an initial toughness of about 300 in-lbs/in$^3$. However, after fusing between 8,000 to 32,000 copies at a temperature of the order of 400° F., the toughness was reduced to 140 in-lbs/in$^3$ which is unsatisfactory and the silicone oil level has been reduced to about 2% which resulted in the loss of release properties. With the oxidative crosslinking, the hardening of the elastomer takes place resulting in cracking, pitting, and eventually fracturing of the rubber layer at the core resulting in catastrophic failure of the fuser roll. While initially the cracks or pits may appear only at the surface of the roll, other cracks and flaws present throughout the rubber layer can propagate sufficiently to cause cohesive failure whereby portions of the rubber come off the roll causing failure of the fuser and surrounding fuser elements. Further, since the amount of silicone release fluid has been depleted, the surface energetics are higher and therefore release of the toner material from the fuser roll becomes more difficult. In addition, with increased hardening of the fuser roll the elasticity in the fuser roll decreases and the ability to release the toner to the paper becomes degraded resulting in a more mottled copy quality in the resulting copies. Furthermore, with increased surface energetics the probability of the fuser roll picking up paper debris and other contaminants which will attract toner is increased.

PRIOR ART

U.S. Pat. No. 2,465,296 to Swiss is directed to the heat stabilization of both fluid silicone polymers and solid polymeric silicones against deterioration when exposed to an oxidizing atmosphere at elevated temperature by adding thereto a metal chelate derived by reacting a metal or metal oxide or other metal compound with an organic compound of the general formula:

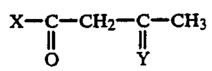

where X is selected from the group consisting of hydrocarbon, alkoxy, and hydrocarbon substituted amino radicals, and Y is selected from the group consisting of oxygen and hydrocarbon substituted imino radicals, the substituted imino radicals being present only when X is a hydrocarbon radical.

U.S. Pat. No. 4,019,024 to Namiki is directed to a roller for fixing toner images on a copy substrate wherein the roller has a radially outer layer made of a silicone rubber impregnated with a silicone oil to provide a comparatively long service life with low toner offset.

U.S. Pat. No. 4,357,388 to Minor describes a hot fuser roll formed from an addition cured polyorganosiloxane formed of a mixture of 70 parts of polymethylvinylsiloxane where the vinyl groups are terminating groups and 30 parts of a blended polymer consisting of the polymethylvinylsiloxane and polymethyl-H-siloxane in which the hydride function is greater than 2.

The article "Increasing the Thermal Stability of Polyorganosiloxanes by Modifying Them with Copper (II) Complexes", E. K. Lugovskaya, et al, Plasticheskie Massy, Vol. 8, 1983, describes increasing the thermal stability of uncrosslinked low molecular weight polymethylphenylsiloxane oil used as a fluid coating on glass fiber filter gauzes by adding thereto copper complexes of polymethylene diamines such as bis (ethylene diamine) copper (II) sulfate. Such use of the copper complex delays the onset of mass loss and reduces the magnitude of mass loss of the oil at elevated temperature and by so doing enhances the flex life of the glass fibers. There is no inference of use with a crosslinked silicone elastomer.

SUMMARY OF THE INVENTION

In accordance with the present invention, a heat stabilized silicone elastomer is provided.

In a further aspect of the present invention a composition curable to a heat stabilized crosslinked silicone elastomer is provided.

In an additional aspect of the present invention a heat stabilized fuser member for electrostatographic reproducing machines is provided which may be used as either a fuser roll or a pressure roll or a release agent donor roll.

The silicone composition curable to a heat stabilized silicone elastomer when mixed with a crosslinking agent and crosslinking catalyst in amounts sufficient to promote crosslinking comprises;

(a) 100 parts by weight of at least one polyorganosiloxane having the Formula "a":

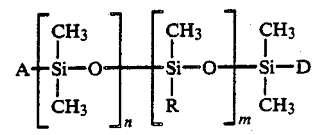

where R is hydrogen or substituted or unsubstituted alkyl, alkenyl or aryl having less than 19 carbon atoms, each of A and D may be any of methyl, hydroxy or vinyl groups, $$0 < m/n \leqq 1 \text{ and } m+n > 350;$$

(b) a complex comprising a transition metal sulfate, nitrate, phosphate, halide, acetate, carboxylate, nitrite or perfluoroborate and at least one polydentate chelating ligand of the formula $$Z\text{-}(R_1\text{—}X)_p\text{-}R_1\text{—}E \text{ or } Z\text{-}(\underset{\displaystyle X'}{R'_1})_p\text{-}R_1\text{—}E$$

where each $R_1$ may be an alkyl biradical having 1 to 6 carbon atoms or an aryl biradical having less than 19 carbon atoms, R', is an X' substituted $R_1$, each of Z and E may be any of carboxy, thiocarboxy, dithiocarboxy or —$N(R_2)_2$, —$As(R_2)_2$, —$S(R_2)$ where each $R_2$ may be any of hydrogen or an alkyl radical having 1 to 6 carbon atoms or any aryl radical having less than 19 carbon atoms, X' may be any of hydrogen, carboxy, thiocarboxy, dithiocarboxy, —$N(R_2)_2$, —$As(R_2)_2$, —$S(R_2)$, X is —$N(R_2)$—, —$As(R_2)$—, or —S— and p is 0 to 4 said complex being present in amounts sufficient to inhibit oxidative degradation of said polyorganosiloxane, (c) from about 5 to about 500 parts by weight of finely divided fillers.

In a further aspect of the present invention the complex may be predispersed in a polyorganosiloxane oil or blend of polyorganosiloxane oils of the formula:

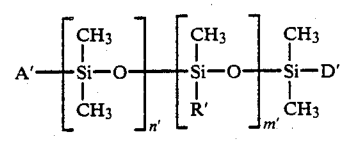

where R' is hydrogen or substituted or unsubstituted alkyl, alkenyl or aryl having less than 19 carbon atoms, each of A' and D' may be any of methyl, hydroxy or vinyl groups, R', A' and D' being selected to minimize reaction with R, A or D in the formula in "a" to minimize the formation of a crosslinked product therebetween, $0 < m'/n' \leqq 1$ and $8 < m'+n' < 2000$, said oil or blend of oils having a viscosity within the range from about 50 centistokes to 100,000 centistokes and being present in an amount of from about 5 to 100 parts per 100 parts of "a".

In a specific aspect of the present invention, the polyorganosiloxane is an addition curable material, and the complex is bis (ethylene diamine) copper (II) sulfate.

In a further aspect of the present invention the complex is initially predispersed in a low viscosity silicone oil to form a dispersion which is subsequently added to a polyorganosiloxane oil having a higher viscosity which is then added to the mixture prior to crosslinking.

DETAILED DESCRIPTION OF THE INVENTION

Figure 1:
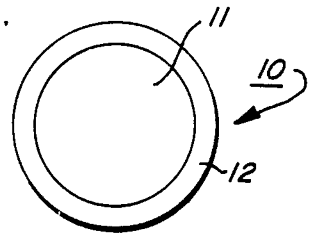
FIG. 1 shows a cross-sectional view of a fuser roll that may be made with the stabilized silicone elastomer of the present invention.

FIG. 1 shows a fuser roll 10 made with an outer layer of the composition of the present invention. Although the fuser member shown in FIG. 1 is in the form of a roll, it is to be understood that the present invention is applicable to fuser members of other shapes, such as plates or belts. In FIG. 1, the fuser roll 10 is composed of a core 11 having coated thereon a thin layer 12 of the composition of the present invention. The core 11 may be made of various metals such as iron, aluminum, nickel, stainless steel, etc., and various synthetic resins. The selection of the core material will depend on the functional requirements of the system such as thermal conductivity, loads and other design considerations. The core 11 is hollow and a heating element (not shown) is generally positioned inside the hollow core to supply the heat for the fusing operation. Heating elements suitable for this purpose are known in the prior art and may comprise a quartz heater made of a quartz envelope having a tungsten resistance heating element disposed internally thereof. The method of providing the necessary heat is not critical to the present invention, and the fusing member can be heated by internal means, external means or a combination of both. All heating means are well known in the art for providing sufficient heat to fuse the toner to the support. The composition of layer 12 will be described in detail below.

Figure 2:
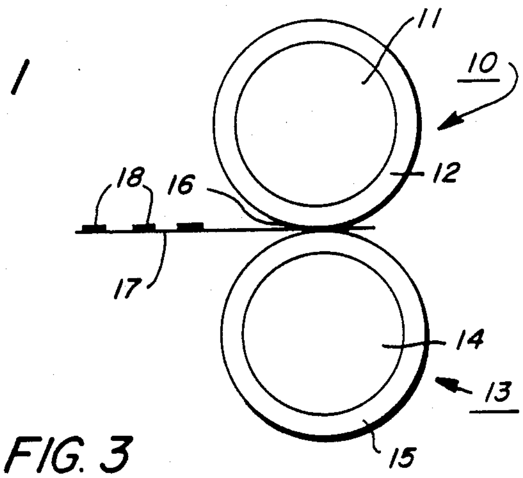
FIG. 2 represents a cross-sectional view of the fuser roll of FIG. 1 as part of a roll pair and maintained in pressure contact with a back up or pressure roll.

Referring to FIG. 2, the fuser roll 10 is shown in a pressure contact arrangement with a backup or pressure roll 13. The pressure roll 13 comprises a metal core 14 with a layer 15 of a heat-resistant material. In this assembly, both the fuser roll 10 and the pressure roll 13 are mounted on shafts (not shown) which are biased so that the fuser roll 10 and the pressure roll 13 are pressed against each other under sufficient pressure to form a nip 16. It is in this nip that the fusing or fixing action takes place. One of the ways of obtaining high quality copies produced by the fuser assembly is when the nip is formed by a relatively hard and unyielding layer 15 with a relatively flexible layer 12. In this manner, the nip is formed by a slight deformation in the layer 12 due to the biasing of fuser roll 10 and the pressure roll 13. The layer 15 may be made of any of the well known materials such as polytetrafluorethylene, polyfluorinatedethylenepropylene and perfluoroalkoxy resin or silicone rubber.

Figure 3:
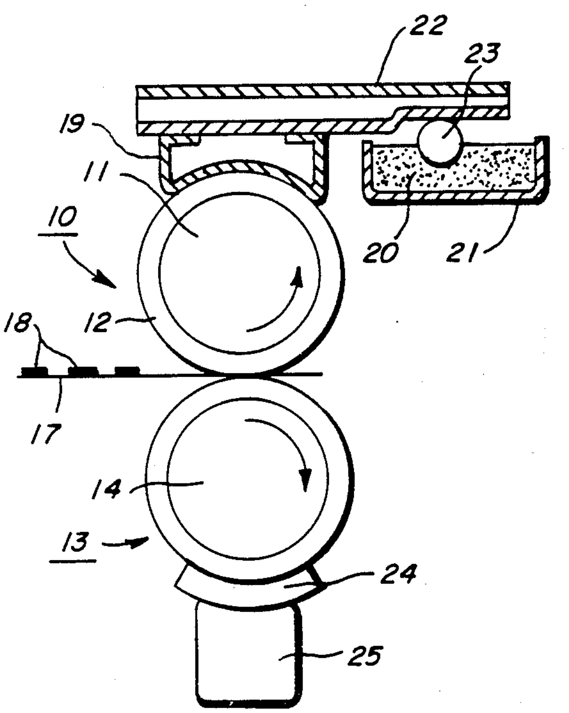
FIG. 3 is a schematic view of a pressure contact fuser assembly which employs a fuser roll comprised of the heat stabilized silicone elastomer according to the present invention.

FIG. 3 shows a pressure contact heated fuser assembly having a sheet of a support material 17, such as a sheet of paper, bearing thereon toner image 18 passing the fuser roll 10 and pressure roll 13. On fuser roll 10 is mounted an intermediate oil-feeding member 19 from which an offset preventing fluid or release agent 20 is applied to the fuser roll 10. Such release agents are known to the art and may be, for example, a silicone oil. The intermediate oil feeding member 19 also performs the function of cleaning the fuser roll 10. The release agent 20 in sump 21 is fed to the oil feeding member 19 through another intermediate oil feeding member 22 and a feeding roll 23. The pressure roll 13 is in contact with a cleaning member 24 mounted on a supporting member 25. Alternatively, the structure depicted may be used without a release agent where the oil feeding member 19 is merely a cleaning pad.

The polyorganosiloxane curable to a silicone elastomer may be selected from the commercially available condensation curable, addition curable, and peroxide curable materials. Typical suitable polyorganosiloxanes are represented by the Formula "a":

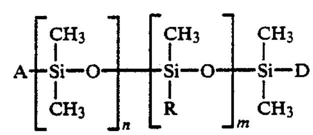

where R is hydrogen or substituted or unsubstituted alkyl, alkenyl or aryl having less than 19 carbon atoms, each of A and D may be any of methyl, hydroxy or vinyl groups and $0<m/n\leq 1$ and $m+n>350$. As used herein the term "aryl" is defined as an organic radical derived from an aromatic hydrocarbon by the removal of one atom; e.g. phenyl from benzene.

The condensation curable polyorganosiloxanes are typically silanol terminated polydimethylsiloxanes such as:

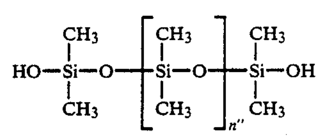

where n'' is 350 to 2700. The terminating silanol groups render the materials susceptible to condensation under acid or mild basic conditions and are produced by kinetically controlled hydrolysis of chlorosilanes. Room temperature vulcanizable (RTV's) systems are formulated from these silanol terminated polymers with a molecular weight of 26,000 to 200,000 and they may be crosslinked with small quantities of multifunctional silanes which condense with the silanol group. Crosslinking agents which are suitable for purposes of the present invention include esters of orthosilicic acid, esters of polysilicic acid and alkyl trialkoxy silanes. Specific examples of suitable crosslinking agents for the condensation cured materials include tetramethylorthosilicate, tetraethyl ortho silicate, 2-methoxyethyl silicate, tetrahydrofurfuryl silicate, ethylpolysilicate and butylpolysilicate, etc. During the crosslinking reaction, an alcohol is typically split out leading to a crosslinked network. We particularly prefer to use condensed tetraethylorthosilicate as a crosslinking agent in the composition of the invention. The amount of the crosslinking agent employed is not critical as long as sufficient amount is used to completely crosslink the active end groups on the disilanol polymer. In this respect, the amount of crosslinking agent required depends on the number average molecular weight of the disilanol polymer employed. With higher average molecular weight polymer there are fewer active end groups present and thus a lesser amount of crosslinking agent is required and vice versa. When excess amounts of crosslinking agents are used, the excess is easily removed from the cured composition. Generally, with the preferred alpha, omega hydroxy polydimethyl siloxane having a number average molecular weight of between about 26,000 to about 100,000 we have found that between about 6 to 20 parts by weight of condensed tetraethylorthosilicate per 100 parts by weight of disilanol polymer to be suitable.

A particularly preferred embodiment of the present invention relates to a liquid addition cured polyorganosiloxanes achieved by using siloxanes containing vinyl groups at the chain ends and/or scattered randomly along the chain which during curing are crosslinked with siloxanes having anything more than two silicon hydrogen bonds per molecule. Typically these materials are cured at temperatures of from about 100° C. to 200° C.

Typical materials are represented by the formula:

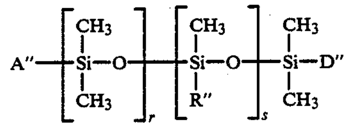

where A″, D″ and R″ are methyl or vinyl provided the vinyl functionality is at least 2, $0<s/r\leqq 1{,}350<r+s<2700$.

By the term the vinyl functionality is at least 2 it is meant that in the formula for each molecule there must be at least a total of 2 vinyl groups in the A″, D″ or any of the several R″ sites within the formula. In the presence of suitable catalysts such as solutions or complexes of chloroplatinic acid or other platinum compounds in alcohols, ethers or divinylsiloxanes reaction occurs with temperatures of 100° C. to 200° C. with the addition of polyfunctional silicon hydride to the unsaturated groups in the polysiloxane chain. Typical hydride crosslinkers are methylhydrodimethylsiloxane copolymers with about 15–70 mole percent methylhydrosiloxane units as illustrated by the formula:

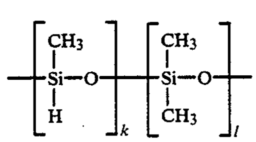

and having a molecular weight of from about 300 to about 3000 wherein the terminal units are trimethyl siloxy or dimethyl hydro siloxy terminated. Elastomers so produced exhibit increased toughness, tensile strength and dimensional stability. Typically, these materials comprise the addition of two separate parts of the formulation, part A containing the vinyl terminated polyorganosiloxane, the catalyst and the filler, part B containing the same or another vinyl terminated polyorganosiloxane, the crosslink moiety such as a hydride functional silane and the same or additional filler where part A and part B are normally in a ratio of one to one. Typical of the materials which may be employed in the practice of the present invention are those commerically available from Dow Corning under the designation Silastic 590, 591, 595, 596, 598, and 599. In addition, similar materials are available from General Electric Corporation under the designation GE 2300, 2400, 2500, 2600 and 2700. During the addition curing operation the material is crosslinked via the equation $$\equiv SiH + CH_2{=}CHSi\equiv \rightarrow \equiv SiCH_2CH_2Si\equiv .$$

Since hydrogen is added across the double bond no offensive byproduct such as acids or alcohols is obtained.

The peroxide curable polyorganosiloxanes, generally known as HTV's, typically are polydimethylsiloxanes with pendant vinyl groups such as are illustrated by the formula:

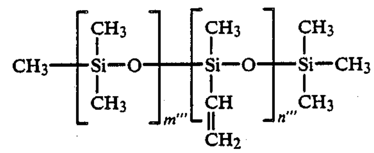

where $O<n'''/m'''\leqq 0.2$ and $m'''+n'''$ is 3,000 to 10,000. These materials are crosslinked at elevated temperatures of about 120° C. with peroxides. As is well known in the art, a variety of groups, including trifluoropropyl, cyanopropyl, phenyl, and vinyl are used to substitute for some of the methyl groups in order to impart specific cure, mechanical or chemical properties to silicone rubber. Introduction of phenyl groups reduces elasticity and increases tensile and tear strength of vulcanizates. Phenyl groups reduce vulcanization yield. Trifluoropropyl groups increase solvent resistance. Introduction of low percentages of vinyl groups reduces vulcanization temperature and imparts greater elasticity and lower compression set to rubbers. Peroxide cure gums may also be vinyldimethylsiloxy terminated. The peroxides most commonly used are benzoyl peroxide and bis(dichlorobenzoyl) peroxide. Dicumyl peroxide can be used for vinyl containing polymers. Generally, peroxide loading is 0.2 to 1.0 percent and cure is at 120°–140° C. In addition, other peroxides such as 2,5 dimethyl 2,5 bis (t-butyl perxoy) hexane can be used to cross link HTV's at temperatures up to 180° C.

Accordingly and by way of example in Formula "a" for the polyorganosiloxane typical substituted alkyl groups include alkoxy and substituted alkoxy, chloropropyl, trifluoropropyl, mercaptopropyl, carboxypropyl, aminopropyl and cyanopropyl. Typical substituted alkoxy substituents include glycidoxypropyl, and methacryloxypropyl. Typical alkenyl substitutents include vinyl and propenyl, while substituted alkenyl include halogen substituted materials such as chlorovinyl, bromopropenyl. Typical aryl or substituted groups include phenyl and chlorophenyl. Hydrogen, hydroxy, ethoxy and vinyl are preferred because of superior crosslinkability. Methyl, trifluoropropyl and phenyl are preferred in providing superior solvent resistance higher temperature stability and surface lubricity. The ratio of m/n being between 0 and 1 identifies the polyorganosiloxane as a copolymer and the sum of m+n being greater than 350 identifies it is an elastomeric material.

To stabilize the crosslinked elastomer against oxidative degradation a complex comprising a transition metal salt such as the sulfate, nitrate, phosphate, halide, acetate, carboxylate, nitrite or perfluoroborate and at least one polydentate chelating ligand is added to the composition prior to crosslinking. By transition metal we mean any element which has partly filled d or f shells in the natural state or in their commonly occurring oxidation state and specifically include titanium, vanadium, chromium, manganese, iron, cobalt, nickel, copper, zirconium, technetium, rhodium, paladium, silver, hafnium, tungsten, rhenium, osmium, iridium and platinum. Copper is preferred because of high solubility and ease of complex formation. The polydentate chelating ligand has the formula:

$$Z \leftarrow\!\!\!\left( R_1 - X \right)_{p} R_1 - E \quad \text{or} \quad Z \leftarrow\!\!\!\left( \underset{\substack{| \\ X'}}{R'_1} \right)_{p} R_1 - E$$

where each $R_1$ may be any alkyl biradical having 1 to 6 carbon atoms, or an aryl biradical having less than 19 carbon atoms, $R'_1$ is an X' substituted $R_1$, each of Z and E may be any of carboxy, thiocarboxy, dithiocarboxy or substituted or unsubstituted nitrogen, sulfur or arsenic and X' may be any of hydrogen, carboxy, thiocarboxy, dithiocarboxy or substituted or unsubstituted nitrogen, sulfur or arsenic. In the conventional sense unsubstituted nitrogen, sulfur or arsenic is intended to define nitrogen, sulfur and arsenic with all available sites bound to hydrogen and substituted nitrogen, sulfur and arsenic is intended to define the direct replacement of one or more bound hydrogen atoms by an $R_1$ radical. In the formula each Z, E and X' may be any of nitrogen or arsenic with two available sites for additional substituion or sulfur with one available site for additional substitution. Accordingly, in the formula Z, E and X' may be any of carboxy, thiocarboxy, dithiocarboxy, $-N(R_2)_2$, $-As(R_2)_2$, or $-S(R_2)$ where each $R_2$ may be any of hydrogen or an alkyl radical having 1 to 6 carbon atoms or any aryl radical having less than 19 carbon atoms. X' may also be hydrogen. In the formula X may be nitrogen or arsenic with one available site for additional substitution or sulfur with no available site for additional substitution. Accordingly, in the formula, X may be $-N(R_2)-$, $-As(R_2)-$, or $-S-$, and p is 0 to 4. Preferred aryl moities include ethyl, propyl, butyl because of low steric hinderance. Preferred aryl moities include phenyl, naphtyl and anthracyl because they are effective as free radical traps and for low steric hinderance. In the formula Z, E, X and X' all have the ability to chelate and to trap free radicals such as $\equiv$SiO., $\equiv$Si., $\equiv SiCH_2O_2$., $\equiv SiCH_2$., and HO. formed during crosslinking. Typical examples of the polydentate chelating ligand include ethylene diamine, diethylene triamine, o-phenylene bisdimethylarsine, glycine, tetramethylene diamine, propylene diamine, isobutylene diamine, butylene diamine, alanine, valine, cysteine, bis (ethylene diethylamino) amine and diethylamino methylene dithiocarboxylic acid.

Specific embodiments of the complex comprising the transition metal salt and the polydentate chelating ligand include bis(ethylene diamine) copper (II) sulfate, bis(propylene diamine) copper (II) sulfate, bis(diethylene triamine) cobalt (III) nitrate, tris(ethlyene diamine) cobalt (III) chloride, bis(ethylene diamine) platinum (II) chloride. The bis(ethylene diamine) copper (II) sulfate is preferred because of its stability and low volatility.

While the polydentate transition metal chelating ligand is added in an amount sufficient to thermally stabilize the elastomer against oxidative degradation at elevated temperatures, it typically is employed in an amount of from about 1 to about 20 parts by weight per 100 parts of the component represented by Formula "a" in the composition.

While not wishing to be bound to any particular theory of operation, it is believed that the complex acts in one way or another to trap the free radicals formed by the oxidative degradation of the elastomer which cause the crosslinking leading to hardening of the elastomer. In particular, it is believed that the complex stops the silicon-oxygen-silicon bond from forming by trapping the intermediate free radicals that are formed during the oxidative degradation. More specifically, it is believed that the rate of oxidative crosslinking of the methyl groups is slowed down by combining the free radicals with a portion of the complex. By inhibiting the oxidative degradation, the area under the stress strain curve (toughness) of the elastomer decreases relatively slowly thereby minimizing the reduction in energy that it takes to fracture the material. Accordingly, catastrophic failure of a fuser roll, for example, where the silicone rubber cracks and comes off the roll, is delayed. The complex may be added directly to the polyorganosiloxane to be crosslinked, to a low viscosity oil, a high viscosity oil, or a blend of the low and the high viscosity oil as will be hereinafter discussed.

In making a fuser member we have found it advantageous to predisperse the complex in a polyorganosiloxane oil in order to wet the surface of the complex particles to thereby deagglomerate them and insure uniform dispersion in the remainder of the formulation. Typically the polyorganosiloxane oil has a formula:

$$A' - \left[ \begin{array}{c} CH_3 \\ | \\ Si - O \\ | \\ CH_3 \end{array} \right]_{n'} \left[ \begin{array}{c} CH_3 \\ | \\ Si - O \\ | \\ R' \end{array} \right]_{m'} \begin{array}{c} CH_3 \\ | \\ Si - D' \\ | \\ CH_3 \end{array}$$

where R' is hydrogen or substituted or unsubstituted alkyl, alkenyl or aryl having less than 19 carbon atoms, each of A' and D' may be any of methyl, hydroxy or vinyl groups. R', A', D' are selected to minimize reaction with R, A, or D in the Formula "a" to minimize the formation of a crosslinked product therebetween and $0 < m'/n' \leq 1$ and $8 < m+n < 2000$. The oil or blend of oils have a viscosity of from about 50 to 100,000 centistokes and are present in an amount of from about 5 to 100 parts per 100 parts of "a". It is desired to minimize the degree of crosslinking of the oil with the material in Formula "a" in order to allow a balanced diffusion rate of the oil out of the elastomer to enhance release during fusing. This may be assisted by using an oil or a blend of oils that are trimethyl-end blocked.

Furthermore we have found that by mechanical grinding, such as wet grinding in a ball mill, three roll mill or sand mill, of the complex with the silicone oil, the particle size of the complex may be reduced to less than about one-half mil thereby providing greater surface area for the complex particles and enabling greater interaction with polyorganosiloxane polymers and greater free radical trapping ability. In a preferred embodiment the complex is predispersed in a blend of a polyorganosiloxane oil having a viscosity of from about 50 to 100 centistokes and a polyorganosiloxane oil having a viscosity of about 100 to about 100,000 centistokes by mechanical grinding and dispersion. In a particularly preferred embodiment we have found that if from about 25 to 30 parts by weight of the complex is initially ground and predispersed in about 70 to 75 parts by weight of a low viscosity silicone oil e.g., 100 centistokes and is subsequently added to about an equal amount of a higher viscosity silicone oil of about 13,000 centistokes a dispersion of paste-like consistency is provided. This dispersion may be added to one or both parts of the polyorganosiloxane composition prior to curing. The resultant after curing is a thermally stable acceptably releasing material.

This two step dispersion of the complex in the silicone oil enables the initial wetting and deagglomeration and crystallite reduction of the complex to permit more uniform dispersion in the polyorganosiloxane. The subsequent addition of the high viscosity oil will cause molecular entanglement between the elastomer and the high viscosity oil thereby slowing down the diffusion of the oil from the silicone elastomer matrix and prolonging the release properties. Suitable oils are available in a viscosity range of 50 centistokes to 100,000 centistokes to which the complex may be added directly in powdered form. Typically, from about 1 to about 20 parts by weight of the complex may be added to from about 0 to about 50 parts of the polyorganosiloxane oil. Alternatively, the complex may be added to a low viscosity oil, a high viscosity oil or a blend of the low and high viscosity oil.

The composition also includes typical filler materials to provide mechanical strength as well as desired thermal properties. Typically from about 5 to about 500 parts by weight of finely divided fillers are present per 100 parts by weight of component in Formula "a". Typical of the materials that may be used as filler materials are the reinforcing and nonreinforcing calcined alumina, tabular alumina, as well as several forms of silica such as fumed silica, silica aerogel, calcined diatomaceous silica, and ground silica. The size of the filler material is preferred to be not larger than about 325 mesh in size in order to be uniformly dispersed throughout the composition to not create large flaws which lead to premature failure.

The crosslinking agent used in the composition is for the purpose of obtaining a material with sufficient crosslink density to obtain maximum strength and fatigue resistance. Examples of typical crosslinking agents have been identified above. The amount of crosslinking agent employed is not critical as long as the amount used is sufficient to sufficiently crosslink the active groups of the polymer used.

Crosslinking catalysts are well known in the art and include among others stannous octoate, dibutyltin dilaurate, dibutyltin diacetate and dibutyltin dicaproate for the condensation cured polyorganosiloxanes. Typical catalysts for the liquid addition cured include chloroplatinic acid as mentioned above. In the peroxide curable material no separate catalyst need be used. The amount of catalyst employed is not critical, however, too small an amount of catalyst may lead to a very slow reaction which is impractical. On the other hand, excessive amounts of catalyst may cause a breakdown of the crosslinked polymer network at high temperatures, to yield a less crosslinked and weaker material, thus adversely affecting the mechanical and thermal properties of the cured material.

Figure 4:
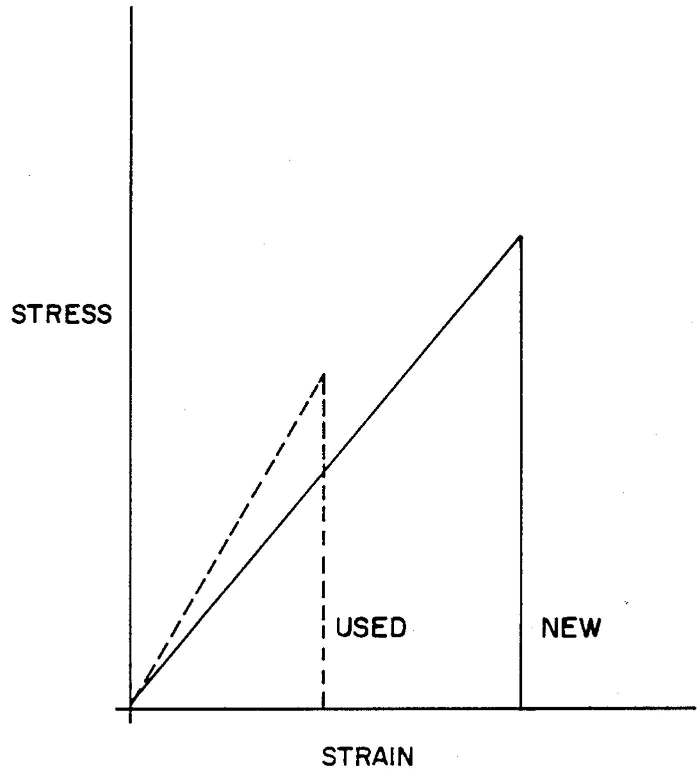
FIG. 4 generally graphically illustrates the toughness (stress versus strain) relationship between a new fuser roll and a fuser roll after use at elevated temperature.

In a preferred application of the present invention, fuser rolls for an electrostatographically reproducing apparatus are made. FIG. 4 illustrates graphically the relationship between stress and strain (toughness) of the silicone elastomer. In FIG. 4, the solid line ideally graphically illustrates the relationship between stress and strain in the elastomer with a new fuser roll at the beginning of its use cycle. The dotted line illustrates typically what happens to the stress strain relationship with continued use of the fuser roll at elevated temperature where oxidative degradation of the elastomer may occur.

The invention will now be described with reference to the following specific examples. Unless otherwise specified, all parts and percentages in the examples in the remainder of this specification are by weight. In the examples which follow it should be noted that Examples 1, 3, 7, 8, 9 and 10 are presented for comparative purposes only.

EXAMPLES 1-9

These examples illustrate the toughness of silicone elastomer prepared according to the present invention upon exposure to air at an elevated temperature of 400° F. In each of the examples test pads were made as follows:

Dow Silastic 595 supplied by Dow Corning, Midland, Michigan, an addition curing liquid polyorganosiloxane, is supplied as two separate translucent paste like liquid parts, part A and part B. Part A is generically believed to be a polymethylvinyl siloxane polymer where the vinyl groups are terminating groups and specifically alpha, omega bis dimethyl vinyl siloxypolydimethylsiloxane having a weight average molecular weight of about 64,000, a molecular weight distribution of about 2.8, and a weight average angstrom molecular size of 1566 as determined by gel permeation chromotography, about 20 percent by weight of reinforcing fumed silica and a small amount of platinum catalyst. Part B is believe to be a blended polymer including the polymethylvinyl siloxane polymer in A together with a polyfunctional silicone hydride in which the hydride function is greater than two and having a weight average molecular weight of about 63,000, a molecular weight distribtuion of about 2.5, a weight average angstrom molecular size of 1550 as determined by gel permeation chromotography and, about 70 percent by weight of a reinforcing fumed silica. Parts A and B were mixed together with the amounts of 100 centistokes polydimethylsiloxane oil and bis(ethylene diamine) copper (II) sulfate complex specified in the table below.

| Example | Complex | Oil | Initial Toughness inch pounds/$in^3$ | Initial Toughness MJ/$m^3$ | Toughness at 8 weeks inch pounds/$in^3$ | Toughness at 8 weeks MJ/$m^3$ |
|---|---|---|---|---|---|---|
| 1 | .5 | 9.8 | 1822 | 12.6 | 408 | 2.82 |
| 2 | 4 | 9.8 | 2287 | 15.8 | 1020 | 7.04 |
| 3 | .5 | 18.6 | 1680 | 11.6 | 268 | 1.85 |
| 4 | 4 | 18.6 | 1602 | 11.1 | 1100 | 7.59 |
| 5 | 2.25 | 14.2 | 2089 | 14.4 | 841 | 5.80 |
| 6 | 8 | 19.6 | 1684 | 11.6 | 1530 | 10.6 |
| 7 | None | 14.2 | 1541 | 10.6 | 209 | 1.44 |
| 8 | None | None | 2384 | 16.4 | 274 | 1.89 |

-continued

| Ex-am-ple | Com-plex | Oil | Initial Toughness inch pounds/in³ | MJ/m³ | Toughness at 8 weeks inch pounds/in³ | MJ/m³ |
|---|---|---|---|---|---|---|
| 9 | .29 | .71 | 2660 | 18.4 | 382 | 2.64 |

The complex was predispersed in the oil by milling after which it was added together with 50 parts by weight part A and 50 parts by weight of part B of the Silastic 595 to an appropriately sized container. The composition was thoroughly mixed using a drill press and a J-shaped impeller for about 15 minutes after which it was degassed which took about 15 minutes in a vacuum chamber at a negative pressure of about 0.5 millimeters of mercury. A thoroughly cleaned four cavity mold 6 inches×6 inches by 0.080 inches coated with a mold release agent, Fluoroglide CP, available from Chemplast, Wayne, New Jersey, was preheated to 250° F. The degassed material was added to the preheated mold and subjected to a molding pressure of 1,000 psi. After a ten minute cure, the pads were removed from the mold and given a four hour post cure in a hot air circulating oven at 400° F.

Four test pads for each example were prepared. One pad was tested immediately following the post cure. The three other pads for each example were placed in an oven at 400° F., one being removed for testing at the end of 1 week, 2 weeks, and 8 weeks. Die C samples were cut from each pad and placed in a Instron, to test for toughness according to ASTM D412.

Figure 5:
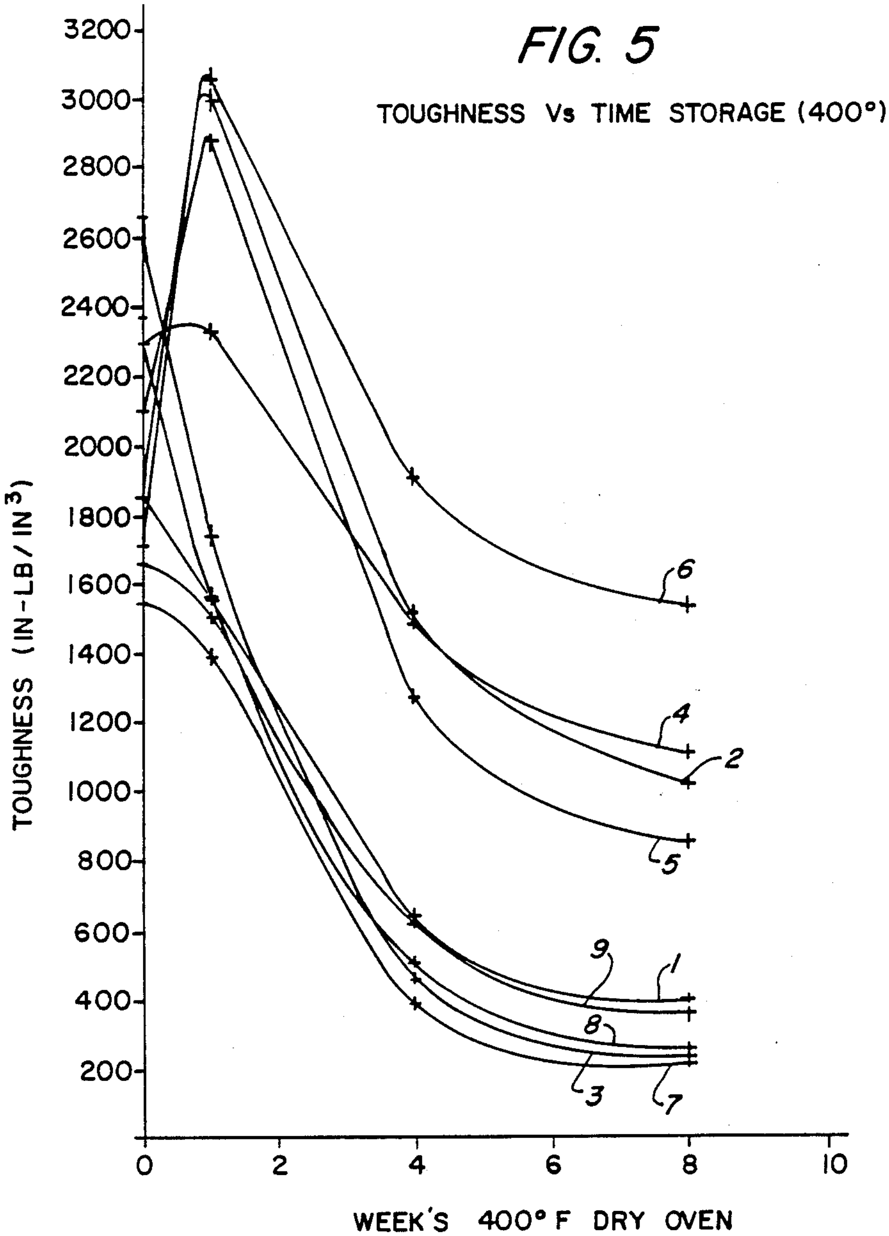
FIGS. 5 and 6 graphically illustrates the toughness as a function of time at elevated temperatures for test pads prepared according to the invention and for comparative purposes.

The pad test results are graphically illustrated in FIG. 5 wherein it may be seen that pads 2, 4, 5, and 6 according to the present invention provided a dramatic improvement over pad number 8 which did not contain any of either the complex or the silicone oil or pad number 7 which, although it contained the silicone oil, did not contain any of the complex. In addition, samples 1 and 3 are shown to contain insufficient complex to produce any improvement over the materials not containing the complex. Test pad number 9 had insufficient complex and silicone oil. A comparison of the test data indicates that an improvement in the aged toughness of from about 100 to about 400 percent may be achieved with the pads of the present invention including sufficient complex and silicone oil.

EXAMPLES 10–13

Four additional test pads were made for each example with part A and part B of Dow Silastic 595 according to the following table:

| EXAMPLE | 10 | 11 | 12 | 13 |
|---|---|---|---|---|
| PART A | 300 grams | none | none | 300 grams |
| PART B | 300 grams | 300 grams | 300 grams | 300 grams |
| Part A with Complex | none | 312 grams | 312 grams | none |
| 14.5% Ball milled Complex | none | none | none | 84 grams |
| 100 cs PDMS | 60 grams | none | 60 grams | none |
| $T_o$ toughness | 2388 | 3191 | 2487 | 2607 |

The $T_o$ toughness in the Table is the initial toughness of one test pad for each example following the post cure. The complex was bis(ethylene diamine) copper (II) sulfate. The procedure for making and testing the test pads was the same as in Examples 1–9 except as follows. In Example 10 no complex according to the present invention was added to the part A and part B of the Dow Sliastic 595. In Examples 11 and 12,300 grams of part A was premixed with 12 grams of dry bis(ethylene diamine) copper (II) sulfate complex on a three roll mill and thereafter added to part B and the test pads prepared as in Examples 1–9. While there is polydimethylsiloxane oil present in Examples 10–12 it should be noted that there is no silicone oil added in Example 11. In Example 13,408 grams of milled dry bis(ethylene diamine) copper (II) sulfate were added to 1,000 grams of polydimethylsiloxane oil having a viscosity of 100 centistokes and ball milled for 2 days. The resulting dispersion was added to an equal weight of polydimethylsiloxane oil, having a viscosity of 13,000 centistokes and rolled in a bottle for 24 hours after which 84 grams were added to part A and part B and the test pads prepared and tested as in Examples 1–9.

Figure 6:
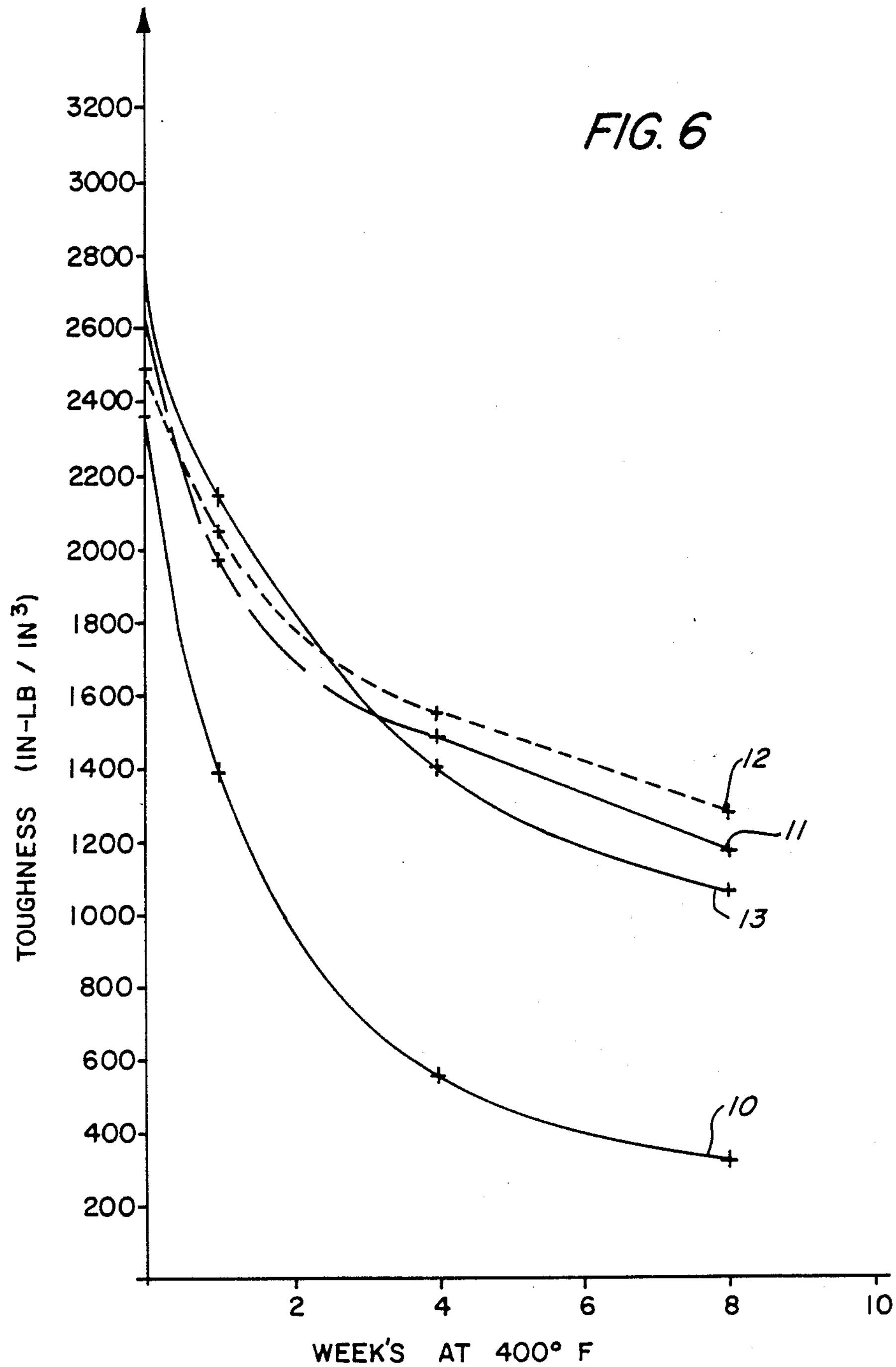

The pad test results are graphically illustrated in FIG. 6, wherein it may be seen that Examples 11–13 provided a dramatic improvement over pad number 10 which did not contain any complex according to the present invention. A comparison of the test data indicates that an improvement in the aged toughness of from abut 300 to 400 percent may be achieved with the pads of the present invention.

EXAMPLES 14–16

These examples illustrate the improvement in fuser roll performance achieved according to the present invention. Three fuser rolls were prepared as follows. Dow Silastic 590 supplied by Dow Corning, Midland, Michigan, an addition curing liquid polyorganosiloxane is supplied as two separate paste like parts, part A and part B. Part A is believed to generically be a polymethylvinyl siloxane polymer, where the vinyl groups are terminating groups and specifically alpha, omega bis(-dimethylvinyl siloxy) polydimethylsiloxane having about 32 percent by weight of fumed and ground silica combined and a small amount of platinum catalyst. Part B is believed to be a blended polymer including the polymethylvinyl siloxane polymer in A together with a polyfunctional silicone hydride in which the hydride function is greater than two and containing about 32 percent by weight of fumed and ground silica. Two parts by weight of milled dry bis(ethylene diamine) copper (II) sulfate were added to 5 parts by weight of polydimethylsiloxane oil having a viscosity of 100 centistokes and ball milled for 2 days. The resulting dispersion was added to 7 parts by weight of polydimethylsiloxane oil having a viscosity of 13,000 centistokes and rolled in a bottle for 24 hours after which it was added together with 50 parts by weight part A and 50 parts by weight part B of the Silastic 590 to an appropriated sized container. The composition was thoroughly mixed using a drill press and a J-shaped impeller for about 15 minutes after which it was degassed which took about 15 minutes in a vacuum chamber at a negative pressure of about 0.5 millimeters of mercury. Thereafter the mixed degassed material was injected under pressure to a cold mold of a fuser roll having an aluminum sleeve core about 1½ inches in diameter centered in the mold to provide a coating on the mold about 0.020 inches thick. After the material had been injected, the mold was placed in a Wabash transfer press with the platen in the press being heated to 300° F. and heated for about 25 minutes. The mold was then removed from the press, quenched by immersion in water and the roll removed. The molded roll was then subjected to a post cure treatment for 4 hours in a hot air oven at 400° F., after which it was ground to a smooth finish in a Southbend grinder.

Three rolls so prepared were life tested as fuser rolls under simulated operator conditions in a Xerox 1035 copier with a soft, 45 durometer Shore A, pressure roll resembling the configuration, generally illustrated in FIG. 2. One roll failed at 32,000 copies by degradation of release properties as a result of depletion of release oil so that toner and copy paper stuck to the roll. This roll was determined to have an oil content of 1.8 percent and a toughness of 980 (the initial toughness was 1905 inch pounds/inch$^3$). Another roll failed at 42,500 copies also by degradation of release properties as a result of depletion of release oil. This roll was determined to have an oil content of 1.3 percent and a toughness of 725 inch pounds/inch$^3$. The third roll performed satisfactorily up to 50,000 copies after which the test was terminated. This roll was determined to have an oil content of 4.5 percent and a toughness of 1175 inch pounds/inch$^3$. None of the rolls failed by the rubber coming off the core.

It is therefore believed that a dramatic improvement in the resistance to oxidative degradation and thereby the toughness at elevated temperature of polyorganosiloxanes has been demonstrated for the present invention. In particular, the presence of the complex has been shown to hold the toughness at elevated temperature of the order of from about 100% to about 400% rendering the present invention suitable for use in a wide variety of silicone elastomers used at elevated temperature. In a preferred application according to the present invention this enables a fuser roll for use in electrostatographic reproducing apparatus to dramatically extend its useful life and fusing reliability. The fuser rolls tested in examples 14–16 showed a failure window starting at 32,000 copies and extending beyond 50,000 copies. This is to be compared to the 8,000–32,000 copy window previously mentioned.

Furthermore, as can be seen in FIG. 5, examples 2, 5 and 6 all of which contained both the complex and the silicone oil show toughness maximum after 1 week aging at 400° F. These are heat stabilized but in addition, their increased toughness over their original values could be enormously beneficial at lower temperatures for a variety of other uses such as belts, pulley and wheels. In addition from FIG. 6, example 11 which contains the complex but no silicone oil, yields an initial toughness equal to the maximum shown by examples 2, 5, and 6 and accordingly this could be enormously beneficial because of its significant increase in toughness for utilization at lower temperatures for similar other applications.

In the examples above, the composition prepared by mixing parts A and B for Dow Silastic 595 is believed to be claimed in U.S. Pat. Nos. 3,445,420 and 4,162,243 and the composition prepared by mixing parts A and B of Dow Silastic 590 is believed to be claimed in U.S. Pat. Nos. 3,445,420 and 4,108,825. All the patents referred to herein are hereby specifically and totally incorporated by reference in their entirety in the instant specification.

While the invention has been described in detail with reference to specific and preferred embodiments, it will be appreciated that various modifications and variations will be apparent to the artisan. For example, in its broadest aspect the invention may be directed to a stabilization of polyorganosiloxanes having many varied applications and uses at elevated temperature. Furthermore, while the invention has been illustrated with regard to a fuser roll in electrostatographic reproducing apparatus wherein the release agent is contained or impregnated within the roll, it should be understood that this same fuser roll may be used in a fusing system wherein additional release fluid may be applied to the surface of the roll on a periodic basis. Furthermore, such a roll may be used as the pressure roll or donor roll in a roll fusing system. All such modifications and embodiments as may readily occur to one skilled in the art are intended to be within the scope of the appended claims.

What is claimed is:

1. A composition curable to a heat stabilized crosslinked silicone elastomer when mixed with a crosslinking agent and crosslinking catalyst in amounts sufficient to promote crosslinking, comprising;

(a) 100 parts by weight of at least one polyorganosiloxane having the Formula "a":

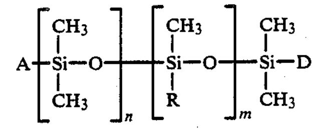

where R is hydrogen or substituted or unsubstituted alkyl, alkenyl or aryl having less than 19 carbon atoms, each of A and D may be any of methyl, hydroxy or vinyl groups, $$0 < m/n \leq 1 \text{ and } m+n > 350,$$

(b) a complex comprising a transition metal sulfate, nitrate, phosphate, halide, acetate, carboxylate, nitrite or perfluoroborate and at least one polydentate chelating ligand of the formula $$Z\!-\!(R_1\!-\!X)_p\!-\!R_1\!-\!E \text{ or } Z\!-\!(\underset{X'}{R'_1})_p\!-\!R_1\!-\!E$$

where each $R_1$ may be an alkyl biradical having 1 to 6 carbon atoms or an aryl biradical having less than 19 carbon atoms, $R'_1$, is an X' substituted $R_1$, each of Z and E may be any of carboxy, thiocarboxy, dithiocarboxy, or $-N(R_2)_2$, $-A_s(R_2)_2$, $-S(R_2)$ where each $R_2$ may be any of hydrogen or an alkyl radical having 1 to 6 carbon atoms or an aryl radical having less than 19 carbon atoms, X' may be any of hydrogen, carboxy, thiocarboxy, dithiocarboxy, $-N(R_2)_2$, $-A_s(R_2)_2$, or $-S(R_2)$, X is $-N(R_2)-$, $-A_s(R_2)-$, or $-S-$ and p is 0 to 4, said complex being present in an amount sufficient to inhibit oxidative degradation of said polyorganosiloxane, (c) from about 5 to about 500 parts by weight of finely divided fillers.

2. The curable composition of claim 1 wherein said at least one polyorganosiloxane as designated in "a" is an addition curable vinyl terminated or vinyl pendant polyorganosiloxane.

3. The curable composition of claim 2, wherein said at least one polyorganosiloxane has the formula:

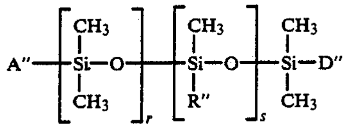

where A", D" and R" are methyl or vinyl provided the vinyl functionality is at least 2, $0<s/r\leqq 1$, $350<r+s<2700$.

4. The curable composition of claim 3, wherein said crosslinking agent is a methylhydrodimethylsiloxane copolymer with from about 15 to 70 mole percent methylhydrosiloxane.

5. The curable composition of claim 2 including said crosslinking agent and catalyst wherein a portion of the polyorganosiloxane is premixed with the crosslinking catalyst and a portion of the filler and the remaining portion of the polyorganosiloxane is premixed with the crosslinking agent and the remaining portion of the filler.

6. The curable composition of claim 1 wherein said at least one polyorganosiloxane as designated in "a" is a condensation curable silanol terminated or silanol pendant polyorganosiloxane.

7. The curable composition of claim 6 including said crosslinking agent and catalyst wherein a portion of the polyorganosiloxane is premixed with the crosslinking catalyst and a portion of the filler and the remaining portion of the polyorganosiloxane is premixed with the crosslinking agent and the remaining portion of the filler.

8. The curable composition of claim 1 wherein said at least one polyorganosiloxane as designated in "a" is a peroxide curable vinyl terminated or vinyl pendant polyorganosiloxane having an $m+n\geqq 3000$.

9. The curable composition of claim 1 wherein said complex is present in an amount of from about 1 to about 20 parts by weight per 100 parts by weight of total polyorganosiloxane as designated in "a".

10. The curable composition of claim 9 wherein said complex is bis(ethylene diamine) copper (II) sulfate.

11. The curable composition of claim 1 wherein said complex is predispersed in a polyorganosiloxane oil or blend of polyorganosiloxane oils of the formula:

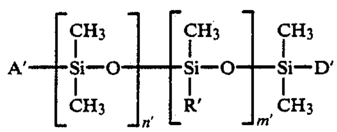

where R' is hydrogen or substituted or unsubstituted alkyl, alkenyl or aryl having less than 19 carbon atoms, each of A' and D' may be any of methyl, hydroxy or vinyl groups, R', A' and D' being selected to minimize reaction with R, A or D in the formula in "a" to minimize the formation of a crosslinked product therebetween, $0<m'/n'\leqq 1$ and $8<m'+n'<2000$, said oil or blend of oils having a viscosity within the range from about 50 centistokes to 100,000 centistokes and being present in an amount of from about 5 to 100 parts per 100 parts of "a".

12. The curable composition of claim 11 wherein said oil comprises a trimethyl-end blocked polyorganosiloxane.

13. The curable composition of claim 11 wherein said at least one polyorganosiloxane as designated in "a" is a liquid addition curable vinyl terminated or vinyl pendant polyorganosiloxane.

14. The curable composition of claim 13, wherein said at least one polyorganosiloxane has the formula:

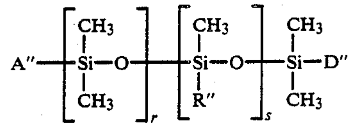

where A", D" and R" are methyl or vinyl provided the vinyl functionality is at least 2, $0<s/r\leqq 1$, $350<r+s<2700$.

15. The curable composition of claim 14, wherein said crosslinking agent is a methylhydrodimethylsiloxane copolymer with from about 15 to 70 percent methylhydrosiloxane.

16. The curable composition of claim 13 including said crosslinking agent and catalyst wherein a portion of the polyorganosiloxane is premixed with the crosslinking catalyst and a portion of the filler and the remaining portion of the polyorganosiloxane is premixed with the crosslinking agent and the remaining portion of the filler.

17. The curable composition of claim 11 wherein said at least one polyorganosiloxane as designated in "a" is a condensation curable silanol terminated or silanol pendant polyorganosiloxane.

18. The curable composition of claim 17 including said crosslinking agent and catalyst wherein a portion of the polyorganosiloxane is premixed with the crosslinking catalyst and a portion of the filler and the remaining protion of the polyorganosiloxane is premixed with the crosslinking agent and the remaining portion of the filler.

19. The curable composition of claim 11 wherein said at least one polyorganosiloxane as designated in "a" is a peroxide curable vinyl terminated or vinyl pendant polyorganosiloxane having an $m+n\geqq 3000$.

20. The curable composition of claim 11 wherein said complex is present in an amount of from about 1 to about 20 parts by weight per 100 parts by weight of total polyorganosiloxane as designated in "a".

21. The curable composition of claim 20 wherein said complex is bis(ethylene diamine) copper (II) sulfate.

22. The curable composition of claim 11 wherein the complex is predispersed in a blend of a polyorganosiloxane oil having a viscosity of from about 50 to 100 centistokes and a polyorganosiloxane oil having a viscosity of from about 100 to about 100,000 centistokes by mechanical grinding and dispersion.

23. A heat stabilized silicone elastomer comprising the crosslinked product of;

(a) 100 parts by weight of at least one polyorganosiloxane having the Formula "a":

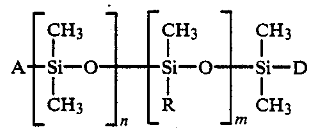

where R is hydrogen or substituted or unsubstituted alkyl, alkenyl or aryl having less than 19 carbon atoms, each of A and D may be any of methyl, hydroxy or vinyl groups, $0<m/n\leqq 1$ and $m+n>350$, (b) a complex comprising a transition metal sulfate, nitrate, phosphate, halide, acetate, carboxylate, nitrite or perfluoroborate and at least one polydentate chelating ligand of the formula $$Z{+}R_1{-}X{+}_pR_1{-}E \text{ or } Z{+}R'_1{+}_pR_1{-}E \quad (R'_1 \text{ bearing } X')$$

where each $R_1$ may be an alkyl biradical having 1 to 6 carbon atoms or an aryl biradical having less than 19 carbon atoms, $R'_1$, is an X' substituted $R_1$, each of Z and E may be any of carboxy, thiocarboxy, dithiocarboxy or $—N(R_2)_2$, $—A_s(R_2)_2$, $—S(R_2)$ where each $R_2$ may be any of hydrogen or an alkyl radical having 1 to 6 carbon atoms or any aryl radical having less than 19 carbon atoms, X' may be any of hydrogen, carboxy, thiocarboxy, dithiocarboxy, $—N(R_2)_2$, $—A_s(R_2)_2$, or $—S(R_2)$, X is $—N(R_2)—$, $—A_s(R_2)—$, or —S— and p is 0 to 4, said complex being present in an amount sufficient to inhibit oxidative degradation of said polyorganosiloxane, (c) from about 5 to about 500 parts by weight of finely divided fillers, and (d) a crosslinking agent and a crosslinking catalyst, said crosslinking agent and catalyst being present in an amount sufficient to promote crosslinking of said at least one polyorganosiloxane.

24. The heat stabilized silicone elastomer of claim 23 wherein said at least one polyorganosiloxane as designated in "a" is a liquid addition curable vinyl terminated or vinyl pendant polyorganosiloxane.

25. The heat stabilized silicone elastomer of claim 24, wherein said at least one polyorganosiloxane has the formula:

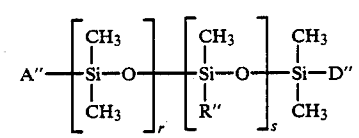

where A'', D'' and R'' are methyl or vinyl provided the vinyl functionality is at least 2, $0<s/r\leqq 1$, $350<r+s<2700$.

26. The heat stabilized silicone elastomer of claim 25, wherein said crosslinking agent is a methylhydrodimethylsiloxane copolymer with from about 15 to 70 mole percent methylhydrosiloxane.

27. The heat stabilized silicone elastomer of claim 24 wherein a portion of the polyorganosiloxane is premixed with the crosslinking catalyst and a portion of the filler and the remaining portion of the polyorganosiloxane is premixed with the crosslinking agent and the remaining portion of the filler.

28. The heat stabilized silicone elastomer of claim 23 wherein said at least one polyorganosiloxane as designated in "a" is a condensation curable silanol terminated or silanol pendant polyorganosiloxane.

29. The heat stabilized silicone elastomer of claim 28 wherein a portion of the polyorganosiloxane is premixed with the crosslinking catalyst and a portion of the filler and the remaining portion of the polyorganosiloxane is premixed with the crosslinking agent and the remaining portion of the filler.

30. The heat stabilized silicone elastomer of claim 23 wherein said at least one polyorganosiloxane as designated in "a" is a peroxide curable vinyl terminated or vinyl pendant polyorganosiloxane having an $m+n\geqq 3000$.

31. The heat stabilized silicone elastomer of claim 23 wherein said complex is present in an amount of from about 1 to about 20 parts by weight per 100 parts by weight of total polyorganosiloxane as designated in "a".

32. The heat stabilized silicone elastomer of claim 31 wherein said complex is bis(ethylene diamine) copper (II) sulfate.

33. The heat stabilized silicone elastomer of claim 23 wherein said complex is predispersed in a polyorganosiloxane oil or blend of polyorganosiloxane oils of the formula:

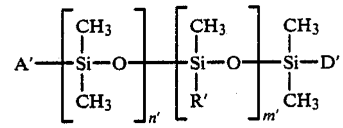

wherein R' is hydrogen or substituted or unsubstituted alkyl, alkenyl or aryl having less than 19 carbon atoms, each of A' and D' may be any of methyl, hydroxy or vinyl groups, R', A' and D' being selected to minimize reaction with R, A or D in the formula in "a" to minimize the formation of a crosslinked product therebetween, $0<m'/n'\leqq 1$ and $8<m'+n'<2000$, said oil or blend of oils having a viscosity within the range from about 50 centistokes to 100,000 centistokes and being present in an amount of from about 5 to 100 parts per 100 parts of "a".

34. The heat stabilized silicone elastomer of claim 33 wherein said oil comprises a trimethyl-end blocked polyorganosiloxane.

35. The heat stabilized silicone elastomer of claim 33 wherein said at least one polyorganosiloxane as designated in "a" is an addition curable vinyl terminated or vinyl pendant polyorganosiloxane including said crosslinking agent and catalyst.

36. The heat stabilized silicone elastomer of claim 35, wherein said at least one polyorganosiloxane has the formula:

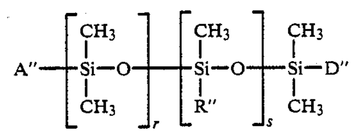

where A'', D'' and R'' are methyl or vinyl provided the vinyl functionality is at least 2, $0<s/r\leqq 1$, $350<r+s<2700$.

37. The heat stabilized silicone elastomer of claim 36, wherein said crosslinking agent is a methylhydrodimethylsiloxane copolymer with from about 15 to 70 mole percent methylhydrosiloxane.

38. The heat stabilized silicone elastomer of claim 35 wherein a portion of the polyorganosiloxane is premixed with the crosslinking catalyst and a portion of the filler and the remaining portion of the polyorganosiloxane is premixed with the crosslinking agent and the remaining portion of the filler.

39. The heat stabilized silicone elastomer of claim 33 wherein said at least one polyorganosiloxane as designated in "a" is a condensation curable silanol terminated or silanol pendant polyorganosiloxane.

40. The heat stabilized silicone elastomer of claim 39 wherein a portion of the polyorganosiloxane is premixed with the crosslinking catalyst and a portion of the filler and the remaining portion of the polyorganosiloxane is premixed with the crosslinking agent and the remaining portion of the filler.

41. The heat stabilized silicone elastomer of claim 33 wherein said at least one polyorganosiloxane as designated in "a" is a peroxide curable vinyl terminated or vinyl pendant polyorganosiloxane having an $m+n \geqq 3000$.

42. The heat stabilized silicone elastomer of claim 33 wherein said complex is present in an amount of from about 1 to about 20 parts by weight per 100 parts by weight of total polyorganosiloxane as designated by "a".

43. The heat stabilized silicone elastomer of claim 42 wherein said complex is bis(ethylene diamine) copper (II) sulfate.

44. The heat stabilized silicone elastomer of claim 33 wherein the complex is initially predispersed in a blend of a polyorganosiloxane oil having a viscosity of from about 50 to 100 centistokes and a polyorganosiloxane oil having a viscosity of from about 100 to about 100,000 centistokes by mechanical grinding and dispersion.

45. A composition curable to a heat stabilized crosslinked silicone elastomer when mixed with a crosslinking agent and crosslinking catalyst in amounts sufficient to promote crosslinking, comprising;

(a) 100 parts by weight of at least one polyorganosiloxane having the Formula "a":

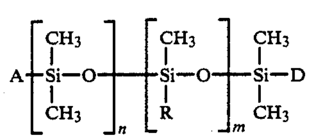

where R is hydrogen or substituted or unsubstituted alkyl, alkenyl or aryl having less than 19 carbon atoms, each of A and D may be any of methyl, hydroxy or vinyl groups, $0 < m/n \leqq 1$ and $m+n > 350$, (b) a complex comprising a transition metal sulfate, nitrate, phosphate, halide, acetate, carboxylate, nitrite or perfluoroborate and at least one polydentate chelating ligand selected from the group consisting of ethylene diamine, diethylene triamine, o-phenylene bisdimethylarsine, glycine, tetramethylene diamine, propylene diamine, isobutylene diamine, butylene diamine, alanine, valine, cysteine, bis(ethylene diethylamino) amine, and diethylamino methylene dithiocarboxylic acid, said complex being present in an amount sufficient to inhibit oxidative degradation of said polyorganosiloxane, (c) from about 5 to about 500 parts by weight of finely divided fillers.

46. The curable composition of claim 45, wherein said complex is selected from the group consisting of bis(ethylene diamine) copper (II) sulfate, bis(propylene diamine) copper (II) sulfate, bis(diethylene triamine) cobalt (III) nitrate, tris(ethylene diamine) cobalt (III) chloride, and bis(ethylene diamine) platinum (II) chloride.

47. The curable composition of claim 46 wherein said complex is bis(ethylene diamine) copper (II) sulfate.

48. The curable composition of claim 45 wherein said complex is predispersed in a polyorganosiloxane oil or blend of polyorganosiloxane oils of the formula:

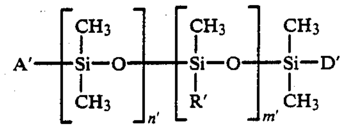

where R' is hydrogen or substituted or unsubstituted alkyl, alkenyl or aryl having less than 19 carbon atoms, each of A' and D' may be any of methyl, hydroxy or vinyl groups, R', A' and D' being selected to minimize reaction with R, A or D in the formula in "a" to minimize the formation of a crosslinked product therebetween, $0 \leqq m'/n' < 1$ and $8 < m'+n' < 2000$, said oil or blend of oils having a viscosity within the range from about 50 centistokes to 100,000 centistokes and being present in an amount of from about 5 to 100 parts per 100 parts of "a".

49. A heat stabilized silicone elastomer comprising the crosslinked product of;

(a) 100 parts by weight of at least one polyorganosiloxane having the Formula "a":

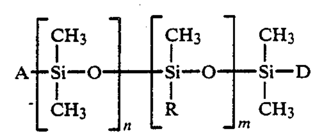

where R is hydrogen or substituted or unsubstituted alkyl, alkenyl or aryl having less than 19 carbon atoms, each of A and D may be any of methyl, hydroxy or vinyl groups, $0 < m/n \leqq 1$ and $m+n > 350$, (b) a complex comprising a transition metal sulfate, nitrate, phosphate, halide, acetate, carboxylate, nitrite or perfluoroborate and at least one polydentate chelating ligand selected from the group consisting of ethylene diamine, diethylene triamine, o-phenylene bisdimethylarsine, glycine, tetramethylene diamine, propylene diamine, isobutylene diamine, butylene diamine, alanine, valine, cysteine, bis(ethylene diethylamino) amine, and diethylamino methylene dithiocarboxylic acid, said complex being present in an amount sufficient to inhibit oxidative degradation of said polyorganosiloxane, (c) from about 5 to about 500 parts by weight of finely divided fillers; and (d) a crosslinking agent and a crosslinking catalyst, said crosslinking agent and catalyst being present in an amount sufficient to promote crosslinking of said at least one polyorganosiloxane.

50. The heat stabilized silicone elastomer of claim 49, wherein said complex is selected from the group consisting of bis(ethylene diamine) copper (II) sulfate, bis(-propylene diamine) copper (II) sulfate, bis(diethylene triamine) cobalt (III) nitrate, tris(ethylene diamine) cobalt (III) chloride, and bis(ethylene diamine) platinum (II) chloride.

51. The heat stabilized silicone elastomer of claim 50 wherein said complex is bis(ethylene diamine) copper (II) sulfate.

52. The heat stabilized silicone elastomer of claim 49 wherein said complex is predispersed in a polyorganosiloxane oil or blend of polyorganosiloxane oils of the formula:

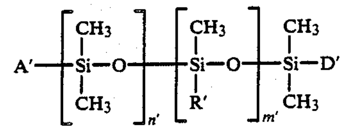

wherein R′ is hydrogen or substituted or unsubstituted alkyl, alkenyl or aryl having less than 19 carbon atoms, each of A′ and D′ may be any of methyl, hydroxy or vinyl groups, R′, A′ and D′ being selected to minimize reaction with R, A or D in the formula in "a" to minimize the formation of a crosslinked product therebetween, $0<m'/n'\leqq 1$ and $8<m'+n'<2000$, greater than 8 and less than 2000, said oil or blend of oils having a viscosity within the range from about 50 centistokes to 100,000 centistokes and being present in an amount of from about 5 to 100 parts per 100 parts of "a".

* * * * *